United States Patent [19]
Verdier

[11] 3,743,000
[45] July 3, 1973

[54] DEVICE FOR MOUNTING AND UNMOUNTING GIANT TIRES

[75] Inventor: Henri Verdier, Beauregard-L'Eveque, France

[73] Assignee: Compagnie Generale des Establissments Michelin, raison sociale Michelin & Cie, (Pay-de-Dome), France

[22] Filed: Feb. 16, 1972

[21] Appl. No.: 226,730

[30] Foreign Application Priority Data
Feb. 19, 1971 France .............................. 7105876

[52] U.S. Cl. ............................. 157/1.33, 157/1.17
[51] Int. Cl. ........................................... B60c 25/06
[58] Field of Search ................... 157/1.1, 1.11, 1.2, 157/1.17, 1.22, 1.24, 1.26, 1.28, 1.3, 1.33

[56] References Cited
UNITED STATES PATENTS
3,648,751   3/1972   Archidoit .......................... 157/1.17
3,574,318   4/1971   Gerbeth ............................ 157/1.17
2,900,016   8/1959   Woodward ........................ 157/1.17

Primary Examiner—Granville Y. Custer, Jr.
Assistant Examiner—H. P. Smith
Attorney—Granville M. Brumbaugh, Donald S. Dowden et al.

[57] ABSTRACT

A device facilitating the mounting and unmounting of a giant pneumatic tire on a wheel comprises a pair of arms pivoted about a pin and a screw by which the distance between the arms can be adjusted. One of the arms rests against the inner side of a flange of a side ring and the other arm rests against an associated conical ring by which a bead of the tire is supported. One of the arms has an adjustable extension by which it can push on the rim well of the wheel. Adjustment of this extension facilitates an axial pull on the side ring and conical ring towards the outside of the wheel. One of the arms also preferably has a second adjustable extension by which it can pull on the rim well. Adjustment of the second adjustable extension facilitates an axial push on the side ring and conical ring towards the inside of the wheel.

4 Claims, 5 Drawing Figures

PATENTED JUL 3 1973 3,743,000

DEVICE FOR MOUNTING AND UNMOUNTING GIANT TIRES

BACKGROUND OF THE INVENTION

This invention relates to the wheels of heavy-duty vehicles and more particularly, to novel and highly effective means facilitating the mounting and unmounting of tires on wheels for road construction vehicles and the like.

Wheels for construction vehicles and the like comprise:

a rim well, which is generally cylindrical;

two conical rings forming seats for the beads of the tire;

two side rings;

a fixed stop for axially locking in position one of the conical rings and the corresponding side ring;

a removable stop for axially locking in position the other conical ring and the corresponding side ring and for permitting the mounting and unmounting of the tire on its seals; and means forming a seal between the rim well and conical rings.

For tires of relatively small dimensions, one of the conical rings is rigidly connected to the rim well, while the other is independent of the rim well. In the case of tires of the largest sizes it is preferable to use two conical rings, both of which are separate from the rim well. Furthermore, as has been proposed by the applicant, it is advantageous that the conical rings and the side rings be wedged permanently on the beads of the tire. Finally, the applicant has also proposed imparting to the side rings a cross-section of a quarter circle extended on the one side by a flange in the direction of the wheel axis. This flange provides a grip which makes it possible to exert a traction or pull on the tire bead.

In mounting a tire for construction vehicles on a wheel it is desirable to exert a traction or pull on the bead so that the conical ring makes good contact with the seal placed in a recess provided in the rim well. Unmounting on the other hand requires a push on the bead in order to free the conical ring wedged on the seal and against the stop.

SUMMARY OF THE INVENTION

An object of the invention is to facilitate the mounting and unmounting of tires on wheels for road construction vehicles and the like. In particular, an object of the invention is to facilitate pulling on the bead during mounting and pushing on the bead during unmounting.

These and other objects are attained in accordance with the invention by the provision of a special mounting device comprising two arms pivoted around a pin, the distance between which is adjustable by means of a screw. One arm rests against the inner face of the flange of the side ring and the other rests on the one hand against the conical ring and on the other hand, via an adjustable extension in the form of a bolt screwed into the arm, against an axial face of the rim well. Turning of this bolt facilitates an axial push on the rim well and an axial pull on the side ring and conical ring towards the outside of the wheel.

One arm can also rest against the rim well via a second adjustable extension in the form of a bolt which is threaded into a tapped sleeve which in its turn is threaded into an internal thread in the rim well.

The operation of the device is very simple. By adjusting the distance between the arms the apparatus is locked against rotation (in the actuating direction of rotation of the bolts) with respect to the assembly comprising the side ring and the conical ring. By causing one or the other of the bolts to turn there is ensured an axial pull or traction towards the outside of the assembly comprising side ring, the conical ring and the bead of the tire, or an axial push or thrust of this assembly towards the inside.

Preferably the radially outward face of the articulated arm in contact with the radially inward face of the side ring flange is curved over a part and only a part (for example, half) of its surface so that, while facilitating the insertion of the end of the apparatus into the cavity defined by the side ring and the conical ring, it opposes the rotation of the apparatus when one or the other of the bolts is screwed in its actuating direction.

BRIEF DESCRIPTION OF THE DRAWING

An understanding of other aspects of the invention can be gained from a consideration of the following detailed description of the preferred embodiments thereof, in conjunction with the appended figures of the drawing, wherein.

DESCRIPTION OF THE PREFERRED EMBODIMENTS

Figure 1:
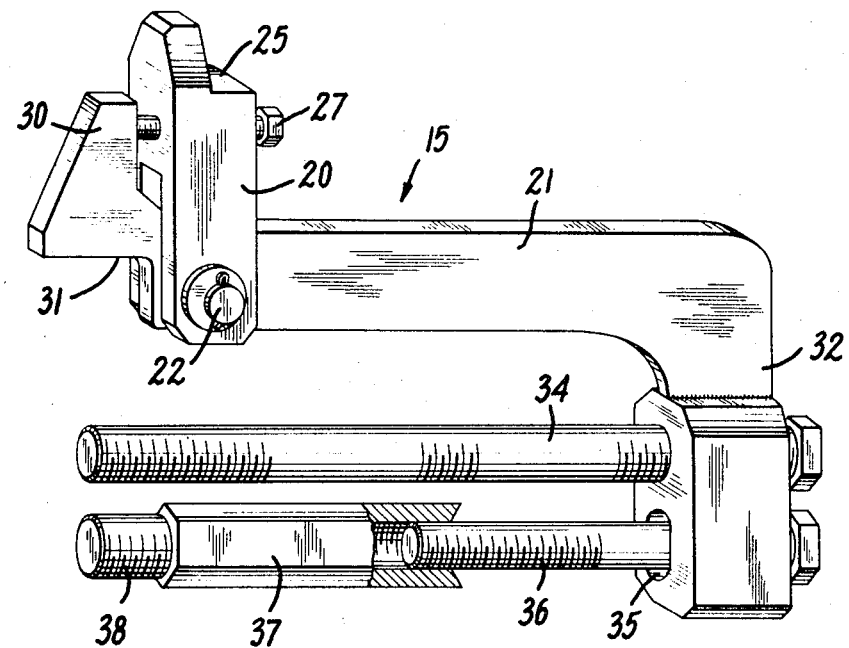
FIG. 1 is a perspective view of a first embodiment of a mounting and unmounting device in accordance with the invention.
Figure 3:
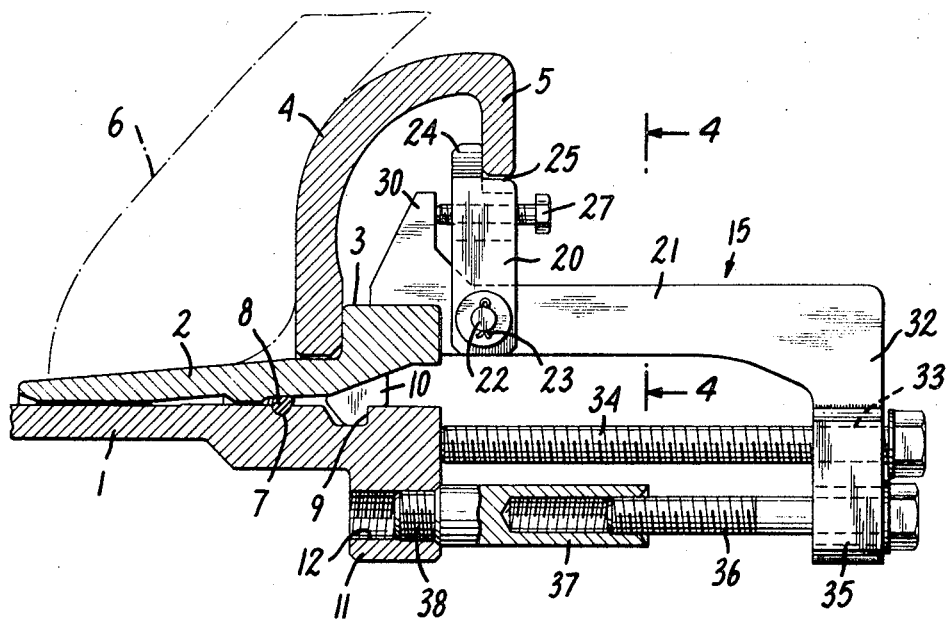
FIG. 3 is a view in radial section of the device of FIG. 1 acting on the outer side of a wheel.

FIGS. 1 and 3, particularly FIG. 3, show the end of a rim well 1 on which there is arranged a conical ring 2 terminating in a shoulder 3 and a side ring 4 provided with a flange 5 extending toward the axis of the wheel. The conical ring 2 bears a tire bead 6, shown in dotted line, and the rim well is formed with a recess 7 for a sealing means 8 as well as a groove 9 for a removable stop 10 in the form of a split ring. The rim well terminates in a flange 11 having threaded holes 12 which can be used to fasten the rim well to the hub (not shown) of the wheel.

Figure 4:
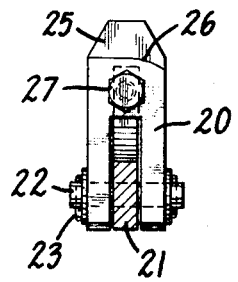
FIG. 4 is a fragmentary sectional view of the device of FIGS. 1 and 3, along the line 4—4 of FIG. 3.

The mounting and unmounting device of the invention is shown at 15 in FIGS. 1 and 3. It comprises two arms 20 and 21 pivoted around a pin 22 which is held by cotters 23. The arm 20 is provided at its end 24 with a recess 25 adapted to rest axially against the flange 5. As FIG. 4 shows, this recess is defined by a surface 26 which is partially flat and partially convexly curved (about half-and-half) so as to lock the arm 20 against clockwise rotation by striking against the flange 5. The arm 20 is furthermore provided with a threaded hole through which there passes a bolt 27 which rests against the end 30 of the arm 21 and locks the angle formed by the arms 20 and 21.

The first end 30 of the arm 21 rests against the conical ring 2 via a right-angle recess 31. The arm 21 has a second right-angle end 32. This end is provided with a threaded hole 33 in which there is screwed a bolt 34 which rests against the flange 11 of the rim well 1. It is also provided with a bore hole 35. Through this bore hole there freely passes a bolt 36 which is threaded into an internally threaded sleeve 37 whose end 38 is screwed into one of the internally threaded holes 12 provided in the flange 11 of the rim well 1.

The operation of the device is very simple. The arm 20 being brought sufficiently close to the end 30 of the arm 21, the device is turned one-quarter of a revolution with respect to the final position shown in FIGS. 1 and 3 so as to introduce the end 24 of the arm 20 and the end 30 of the arm 21 between the shoulder 3 and flange 5 of the conical ring 2 and of the side ring 4. The device 15 is then placed in its normal position and the bolt 27 is screwed to lock the device between the shoulder 3 and flange 5. It is then sufficient to screw the bolt 34 in order to exert a traction or pull on the assembly formed of the side ring 4, the conical ring 2 and the bead 6 until the conical ring 2 bearing the bead 6 is in contact with the split ring 10 which has been previously placed in the groove 9.

Of course, in order to exert a traction at various points, one may use two, three or four similar devices 15 distributed around the axis of the wheel opposite threaded holes 12. In this way, despite the considerable weight of the parts constituting the wheel, one easily succeeds in directing the conical ring 2 in such a manner that it bears against the gasket or sealing means 8. The tire can then be inflated and its positioning completed by the inflation pressure.

When it is desired to remove the tire, after it has been deflated, it is necessary to push back the conical ring 2 which may be wedged on the removable stop 10. For this purpose the device 15 in accordance with the invention is mounted as previously. The bolt 34 is unscrewed, since it is not needed for this operation. The end 38 of the internally threaded sleeve 37 is threaded into a threaded hole 12. It is then sufficient to screw the bolt 36 in order to axially push back towards the inside of the tire the arm 21 which is locked between the shoulder 3 and flange 5, until the conical ring 2 is sufficiently far from the split ring 10 that the latter can be extracted from the groove 9. The gasket 8 can then also be removed and the tire extracted after the device 15 is placed aside. Of course, in this case also, it may be necessary or desirable to use several devices 15.

Figure 2:
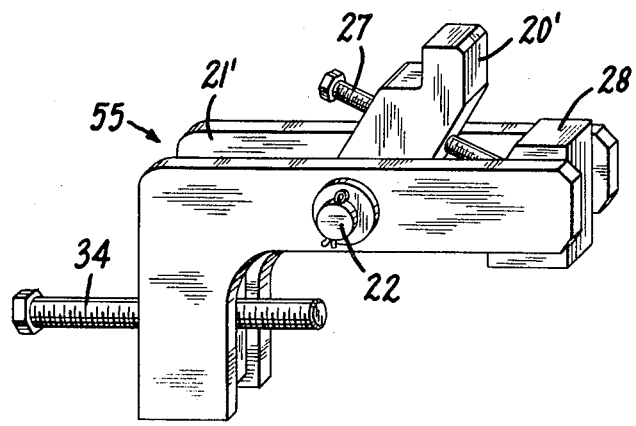
FIG. 2 is a perspective view of a second embodiment of a mounting device in accordance with the invention.
Figure 5:
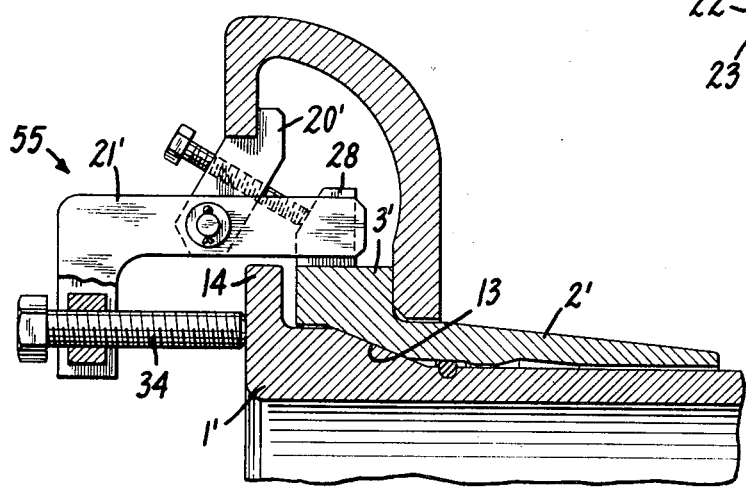
FIG. 5 is a view in radial section of the device of FIG. 2 acting on the inner side of the wheel.

FIGS. 2 and 5 show another embodiment 55 of the invention, which is intended more particularly to facilitate the mounting of the tire on the side of the rim well having a fixed flange 14.

The rim well 1' is terminated by a conical portion 13 and by the rim 14. In this embodiment, the arm 20' of the device 55 is inclined with respect to the arm 21' in operating position. The arm 21' rests on the shoulder 3' of the conical ring 2' only via its radial face, doing so via a block 28.

The other parts both of the wheel or its component parts and of the device 55 are functionally identical to those shown and indicated in FIGS. 1 and 3.

On the side of the tire rim provided with a fixed rim it is generally not necessary to provide special unmounting tools. On building sites one always has available, as a matter of fact, hydraulic jacks which can rest on one side on the vehicle and on the other side on the bead of the tire.

Thus there is provided in accordance with the invention novel and highly effective means facilitating the mounting and unmounting of giant pneumatic tires on construction vehicles and the like. The invention takes advantage of the special shape of the side ring. Many modifications within the spirit and scope of the invention of the representative embodiments disclosed herein will readily occur to those skilled in the art upon study of the present disclosure. Accordingly, the invention is to be construed as including all the embodiments thereof within the scope of the appended claims.

I claim:

1. A device for mounting a pneumatic tire on a wheel formed with a rim well so that at least one bead of said tire is supported by a conical ring and by a side ring formed with a flange for providing a grip, said device comprising:
   a pin;
   a pair of arms pivoted about said pin; and
   adjustment means for adjusting the distance between said arms so that one arm abuts said flange and the other arm abuts said conical ring;
   one of said arms comprising an adjustable extension by which it also is adapted to push on said rim well, adjustment of said extension facilitating an axial pull on said side ring and said conical ring towards the outside of said wheel.

2. A device according to claim 1 wherein said one arm is formed with a radially outer face and said flange is formed with a radially inner face, said faces being adapted to abut each other to permit a locking in rotation in one direction about an axis parallel to the axis of said wheel, and said radially outer face being convexly curved over a part and only a part of its extent to permit rotation in the other direction about said axis, whereby both the actuation and the emplacement and removal of said device are facilitated.

3. A device according to claim 1 which is also adapted for unmounting a pneumatic tire, one of said arms comprising a second adjustable extension by which it is adapted to pull on said rim well, adjustment of said second adjustable extension facilitating an axial push on said side ring and said conical ring towards the inside of said wheel.

4. A device according to claim 3 wherein said adjustment means, said adjustable extension and said second adjustable extension all comprise thread means by which said several adjustments are effected.

* * * * *